No. 824,022. PATENTED JUNE 19, 1906.
E. E. JAMES.
EXPANSIBLE PULLEY.
APPLICATION FILED NOV. 20, 1905.
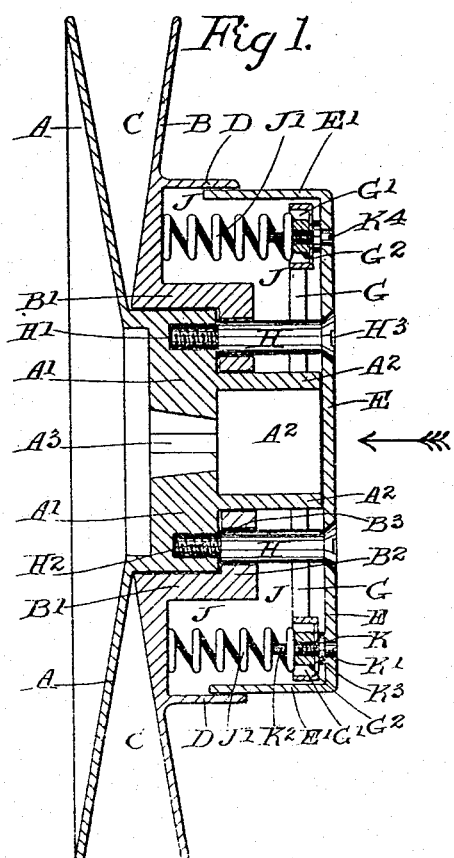
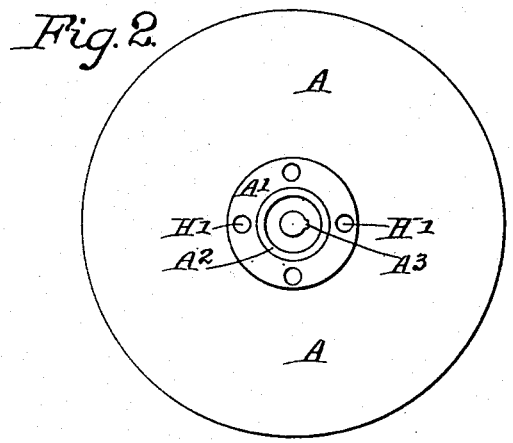
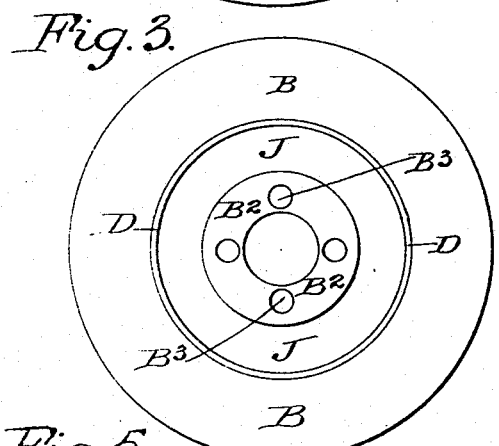
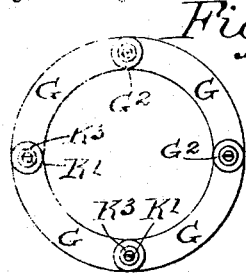
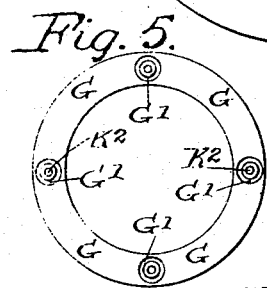
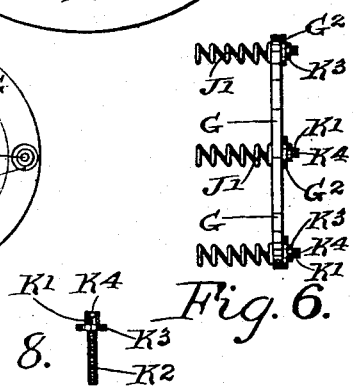
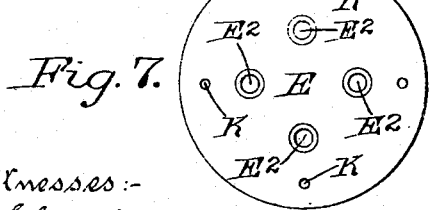
Inventor:—
Edwin E. James

UNITED STATES PATENT OFFICE.

EDWIN ERNEST JAMES, OF MELBOURNE, VICTORIA, AUSTRALIA.

EXPANSIBLE PULLEY.

No. 824,022.　　　　Specification of Letters Patent.　　　Patented June 19, 1906.

Application filed November 20, 1905. Serial No. 288,271.

*To all whom it may concern:*

Be it known that I, EDWIN ERNEST JAMES, engineer, a subject of the King of Great Britain and Ireland, residing at "Bendigonia," St. Kilda Road, Melbourne, county of Bourke, in the State of Victoria, Commonwealth of Australia, have invented certain new and useful Improvements in Expansible Pulleys, of which the following is a specification.

The object of my invention is to provide an improved pulley for transmitting power by means of a driving belt or chain, which pulley will not only be capable of automatically expanding or contracting, but will also act as a cushion to regulate and diminish the strain upon the said belt or chain.

My invention automatically regulates the gear and will be of great utility when applied to engines driving motor-velocipedes and automobiles. It is well known that when an incline has to be ascended or when an engine is first started the strain upon the driving belt or chain is severe and often causes the breakage of the said belt or chain. In addition, the life of the ordinary pulley attached to the engine-shaft is of short duration, owing to the severity of the strain. With my invention fitted to a motor-velocipede or automobile it is possible to ascend an incline with greater ease, with less power, and also with considerably less strain or tension upon the belt or wearing parts. In operation the strain of the belt or chain is taken up by my expansible pulley, which, as it expands in the manner hereinafter described, automatically lowers the gear, and thus renders the ascent of greater ease and at a reduced cost of power.

In the past various devices have been used to raise or lower a gear to suit various requirements and varying tensions on the driving belt or chain; but with my invention the raising or lowering of the gear is effected automatically and the strain gradually absorbed by springs. The wear upon the pulley is more evenly distributed, and its life consequently much lengthened.

My invention consists of few parts, all of which are of easy accessibility for adjustment or repair. The parts are cheap in first cost, and my invention may, in a few moments, be fitted to an ordinary engine-shaft.

In the accompanying drawings, illustrating my invention, I have shown it as particularly suitable for attachment to a belt-driven motor velocipede or automobile; but it will be clearly understood that with but slight modification it is applicable to various descriptions of shafts for transmitting power.

The slack in the belt or chain which ensues as the driving belt or chain descends into the V-shaped groove in the expansible pulley is taken up by a jockey or guide-roller and support of any suitable construction and mounted where convenient.

Referring to the drawings which form a part of this specification, Figure 1 is a longitudinal section of my expansible pulley. Fig. 2 is a side elevation, on a reduced scale, of the inner bevel-shaped disk dismembered and looked at in the direction of the arrow in Fig. 1. Fig. 3 is a similar view of the outer bevel-shaped disk. Fig. 4 is a similar view of the adjusting-ring. Fig. 5 is a detailed view of the same ring looked at from the opposite side. Fig. 6 is a side elevation of Fig. 4, showing the adjustable springs in position. Fig. 7 is a view of the cover on a reduced scale looked at in the direction of the arrow in Fig. 1. Fig. 8 is a detailed view of an adjusting-screw.

Similar letters of reference indicate similar or corresponding parts where they occur in the several views.

My invention includes an inner bevel-shaped disk A, which has a boss A' and an extension thereof A². Within the interior of the boss A' is a slot A³ to accommodate a key or feather, which secures the pulley to the engine-shaft. In the boss A' are three, four, or more threaded holes H' to accommodate the threaded portion H² of guide pins or fins H, hereinafter mentioned. Adjacent to the inner bevel-shaped disk A is an outer bevel-shaped disk B, between which is a V or wedge shaped groove C to accommodate the driving belt or chain. If necessary, the beveled faces of the inner disk A and the outer disk B are provided with ribs or projections to better grip the said driving belt or chain. Integral with the outer bevel-shaped disk B is a circular collar D and a shoulder B'. This shoulder has integral therewith a flange B². In the said flange B² are made three, four, or more holes B³ to accommodate guide pins or fins H, upon which the outer bevel-shaped disk slides or expands. Between the collar D and the shoulder B' is a circular passage-way or recess J to accommodate adjustable springs J', hereinafter mentioned. The flange B² embraces and also slides upon the extension A², before mentioned.

Fitting into the collar D is a cover E. This cover has inwardly-projecting sides or lips E', around which the said collar slides. In the cover E are three, four, or more countersunk holes E² to accommodate the guide pins or circular fins H. These fins H each have a threaded extension H² and a head which has a slot H³, by means of which it is screwed in position into the countersunk holes E². The threaded extensions H² engage in the holes H' in the boss A'. When more than the ordinary pressure or strain is put upon the driving belt or chain, the outer bevel-shaped disk B cushions the tension and slides along the fins H, thus spreading the strain and at the same time diminishing the gear.

To regulate the movement of the outer bevel-disk B, I provide three, four, or more adjustable compression-springs J'. The inner ends of these springs bear against the outer disk B and are secured at their other ends within circular recesses G', formed in small bosses G² upon the outer face of an adjusting-ring G. This adjusting-ring G fits within the cover E. In the cover E are a series of three, four, or more holes K to accommodate the heads K' of adjusting-screws K². The said screws have shoulders K³, which shoulders do not pass through the holes K in the cover E, but bear against the same.

When it is desired to regulate the distance the outer bevel-shaped disk B is to expand or slide, the heads K' are by means of the slot K⁴ therein turned either to the right or to the left, as is desired, or as the case may be. When the more than ordinary strain or pressure on the driving belt or chain is reduced, the outer bevel-shaped disk B is gradually forced by the adjustable springs J' back into its normal position, and thus the gear is again raised.

It will be readily understood that my invention is applicable to many descriptions of driving-pulleys and is of such simple construction that while it can in a few moments be regulated at will it is not likely to derangement. It will also save the time ordinarily spent in shortening a belt or chain that has stretched or lengthened, as in cases of changes in the weather. In addition it will obviate delays caused by breakages.

Having now described my invention, what I claim as new, and desire to secure by Letters Patent, is—

In an expansible pulley, a beveled disk provided with a boss and an extension from the boss, an oppositely-beveled disk recessed to slide upon the boss and provided with an annular collar, a cover fitted within said collar and secured to said boss, and a series of springs within said cover connected to a ring at one end and bearing at their opposite ends against the inner wall of one of the beveled disks, substantially as described.

In testimony whereof I affix my signature in the presence of two subscribing witnesses.

EDWIN ERNEST JAMES.

Witnesses:
  CECIL McPLASTRIER,
  GEO. A. U'REW.